United States Patent [19]
Färber

[11] Patent Number: 5,533,766
[45] Date of Patent: Jul. 9, 1996

[54] FUEL TANK LOCK SYSTEM FOR A GASOLINE TANK FILLER NECK OF A MOTOR VEHICLE

[75] Inventor: Manfred Färber, Wielenbach, Germany

[73] Assignee: Webasto Karosseriesysteme GmbH, Germany

[21] Appl. No.: 167,352

[22] Filed: Dec. 15, 1993

[30] Foreign Application Priority Data

Dec. 15, 1992 [DE] Germany ........................ 42 42 228.0

[51] Int. Cl.⁶ .................................................. B65D 45/00
[52] U.S. Cl. ...................... 292/144; 296/97.22; 292/280; 292/201; 70/158
[58] Field of Search ........................ 296/97.22; 292/144, 292/201; 70/242–244, 280, 158, 159, 166

[56] References Cited

U.S. PATENT DOCUMENTS

| | | | |
|---|---|---|---|
| 2,237,192 | 4/1941 | Minkow et al. | 292/201 |
| 2,314,710 | 3/1943 | Keller | 296/97.22 |
| 3,374,007 | 3/1968 | Ingolia | 296/97.22 |
| 3,750,825 | 8/1973 | Bachle | 296/97.22 |
| 3,759,075 | 9/1973 | Lipschutz | 70/159 |
| 5,066,062 | 11/1991 | Sekulouski | 296/97.22 |
| 5,069,500 | 12/1991 | Reihl et al. | |
| 5,072,986 | 12/1991 | Tai et al. | 296/97.22 |
| 5,383,500 | 1/1995 | Dwars et al. | 141/98 |

FOREIGN PATENT DOCUMENTS

| | | |
|---|---|---|
| 1084094 | 1/1955 | France . |
| 3928580 | 4/1990 | Germany . |
| 767020 | 1/1957 | United Kingdom . |

*Primary Examiner*—Darnell M. Boucher
*Attorney, Agent, or Firm*—Sixbey, Friedman, Leedom & Ferguson; David S. Safran

[57] ABSTRACT

A tank lock system for a gasoline tank of a motor vehicle having a filler neck in a fueling area near the periphery of the motor vehicle body, a tank cap for sealingly closing the filler neck, as well as a pivotable tank cover for covering or providing access to the fueling area, and a device for the unlocking of the tank cap. The tank cap and the tank cover constitute a single unit for simultaneously opening or closing the filler neck and providing or denying access to the fueling area, thereby ensuring a safe, secure, and comfortable operation of a tank lock system.

14 Claims, 2 Drawing Sheets

FUEL TANK LOCK SYSTEM FOR A GASOLINE TANK FILLER NECK OF A MOTOR VEHICLE

BACKGROUND OF THE INVENTION

1. Field of the Invention

The invention relates to a fuel tank lock system for a gasoline container of a motor vehicle having a filler neck extending near the periphery of the motor vehicle body, a tank cap sealingly closing it, as well as a pivotable tank cover for covering or releasing the tank cap. In particular, to such a lock system in which an electrically actuated locking member is provided for the tank cover.

2. Description of the Related Art

In previous fuel tank lock systems, a filler neck, extending from the gasoline container, is tightly closed manually by means of a threaded tank cap. The fuel tank cap, itself, is concealed by a cover embedded into one of the vehicle side walls. A fuel tank cover is known, from German reference DE 39 28 580 C2, which is resiliently pretensioned in the opening direction, whereby the tank cover opens automatically responsive to an electrical releasing of an arresting mechanism. The closing of the fuel tank cover, as well as the opening and closing of the fuel tank cap are effected manually. However, fuel tank caps which open and close manually have a number of disadvantages. The area around the filler neck is frequently soiled by gasoline residues, which means that the handling of the fuel tank cap results in dirty hands. The fuel tank cap, moreover, often is lost by being left behind at the gasoline station or by theft, resulting in the sloshing of fuel through the filler neck when the tank is full, or, conversely, leading to a contamination of fuel due to penetration of dirt particles. Moreover, leaking liquid or vaporous fuel considerably increases the danger of a vehicle fire, or explosion.

SUMMARY OF THE INVENTION

It is the primary objective of the present invention, therefore, to provide a fuel tank lock system which permits a comfortable and safe operation, while eliminating the previously described drawbacks.

This objective is achieved by the tank cap and the tank cover forming a unit which can be actuated by way of a drive motor, to release or close the filler neck.

Due to the fact that the tank cap, in the form Of a closure element, forms an integrated unit with the tank cover, the tank cap does not have to be separately activated, and also, can no longer be lost. The fact that the opening and closing is effected by way of a drive motor means that it is no longer necessary to touch any parts of the vehicle during the fueling process. It is only necessary to insert the nozzle into the filler neck and remove it after completing the fueling operation. In the instance of a manual operation, it is likewise unnecessary to touch that tank cap part of the unit which comes in contact with the fuel. It is sufficient to press the tank cover shut for a tight closing of the filler neck.

In a first advantageous embodiment, the unit is pivotally connected at an axis that is fixed, whereby, the opening of the unit occurs in a similar manner as previously described in connection with the tank cover. The actuating mechanism of such a fuel tank lock system is especially simple.

In a second advantageous embodiment, the unit is pivotally mounted on a movable slider. Here, the outer tank cap, during the opening process, is initially slightly lifted off the filler neck, and subsequently, is transported completely past the filler neck. The movement of the slider, advantageously, occurs on a plane which is perpendicular to the axis of the filler neck.

Another advantageous embodiment of the tank lock system comprises a mechanism for moving the unit, while simultaneously bringing an arresting mechanism into engagement, during the closing of the filler neck. As a result, a theft-proof locking of the tank lock system is achieved by way of only a single drive and only a single mechanism.

An advantageous configuration of the unit is which comprises a two-arm lever, having an actuating pin provided at one end of one arm of the lever, an arresting pin at the end of the other are of the lever, and a fixed pivot point therebetween. A coordinated displacement and locking mechanism may, then, have a lock assembly that is displaceable essentially normal to the axis of the filler neck, and which, by way of a fork-like slot, is in engagement with the actuating pin, and furthermore has a catch which embraces the arresting pin when the unit is closed. This configuration is simple and cost-effective in its construction, and, due to the small number of movable parts, very sturdy in its operation.

For the purpose of applying contact pressure onto the filler neck, to effect a tight sealing thereof, it is advantageous for the catch to have a ramp, which is slightly inclined with respect to the actuating direction of the lock assembly, so that the ramp exerts an increasing pressure onto the lock assembly during the closing process.

It is also of advantage to provide a sensor which is located near the filler neck, at least when it is in an open condition. The sensor, after sensing the completion of the tank fueling process, sends a control signal to the drive motor for effectuating a time-delayed closing of the unit. The sensor employed may be, for instance, a conventional optical sensor which responds to the removal of the nozzle. An automatic closing system of this kind gives particular assurance that the tank lock system is always closed, except during the fueling process.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENT

Figure 1:
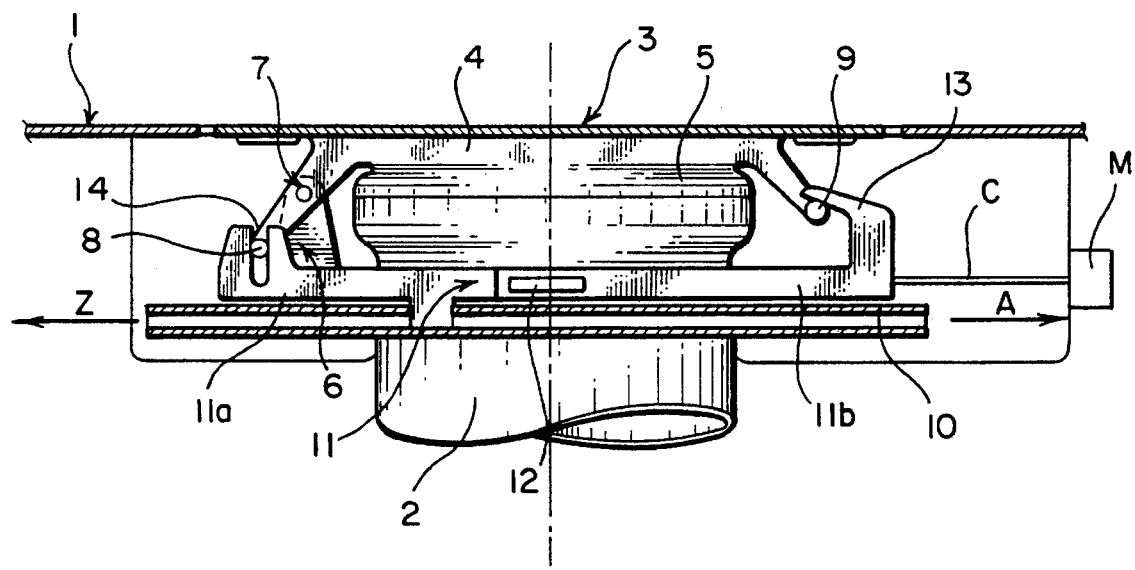
FIG. 1 is a top view showing a tank lock system with a fixed pivot axis, in closed condition.

Numeral 1 of FIG. 1 designates a side wall of a motor vehicle. In a conventional manner, the side wall 1 has a recess into which a filler neck 2 of a gasoline tank (not depicted) terminates. The recess in vehicle side wall 1 is covered by a cover and closure unit 3 which comprises an outer tank cover 4 and a closure element 5 directly connected thereto. When closed, tank cover 4 is flush with vehicle side wall 1, and closure element 5 sealingly closes filler neck 2. Closure element 5, thus, assumes the function of a conventional gasoline tank cap, which usually must be manually attached to the filler neck by a screw thread or bayonet type connection.

Unit 3, on its inner side, at both sides of closure element 5, has two tongue-like projections. Unit 3 is pivotally connected to a hinge 6 that is fixed on the vehicle body by a pivot pin 7 which is connected to hinge 6 and pivotally connected to one of the two tongue-like projections. At the end of the same tongue-like projection receiving pivot pin 7, there is an actuating pin 8, while at the end of the other tongue-like projection, there is an arresting pin 9.

Above and below filler neck 2, at the base of the recess, there are two guides 10, along which, a locking linkage, designated in its entirety as 11, is moveable by means of a drive motor M. The lock assembly comprises two overlapping elements 11a and 11b, which can be selectively interconnected or released by means of a arresting block 12, which is received in a respective opening of element 11b and is movable in a direction which is normal to the plane of the drawing plane. The manner in which elements 11a and 11b are interconnected and released, by themselves, form no part of this invention, and for example, can be constructed and operated in the manner shown and described in detail in U.S. Pat. No. 5,069,500, relative to the use of a cam-type locking slide to couple and uncouple pushout lever and locking bar parts for joint and separate movement along a glide track (see part 84 which serves for coupling parts 64 and 77 in FIGS. 5b, 6b and 13 along with the description spanning col. 7, line 35 to col. 9, line 40 of said patent). Thus, a detailed description of the structure used to couple and uncouple elements 11a and 11b via the arresting block 12 is being omitted and reference can be made to U.S. Pat. No. 5,069, 500 for a more complete understanding of this feature.

The drive element 11a of the locking linkage, depicted in the left section of the drawing, is displaceable along guides 10 in a plane which is normal to the axis of filler neck 2. Drive element 11a has a slot 14, extending perpendicular to its actuating direction, which receives actuating pin 8, and which carries it along, when drive element 11 a is displaced. To this end, the length of slot 14 is selected such that it offsets the movement of pin 8 in the direction of the axis of filler neck 2, caused by the rotation of actuating pin 8 around pivot axis 7.

Locking element 11b of lock assembly 11, depicted at the right side of the drawing, is connected with a mechanism that is actuated by the drive motor M, for example, by a pressure-resistant cable C, and by means of such a cable C, is likewise transported along guides 10, as is known in connection with sliding roofs, such as that of the above-referenced patent. At its free end, the locking element 11b has a catch 13, which, when closed, engages arresting pin 9 of unit 3, thereby retaining it.

Figure 2:
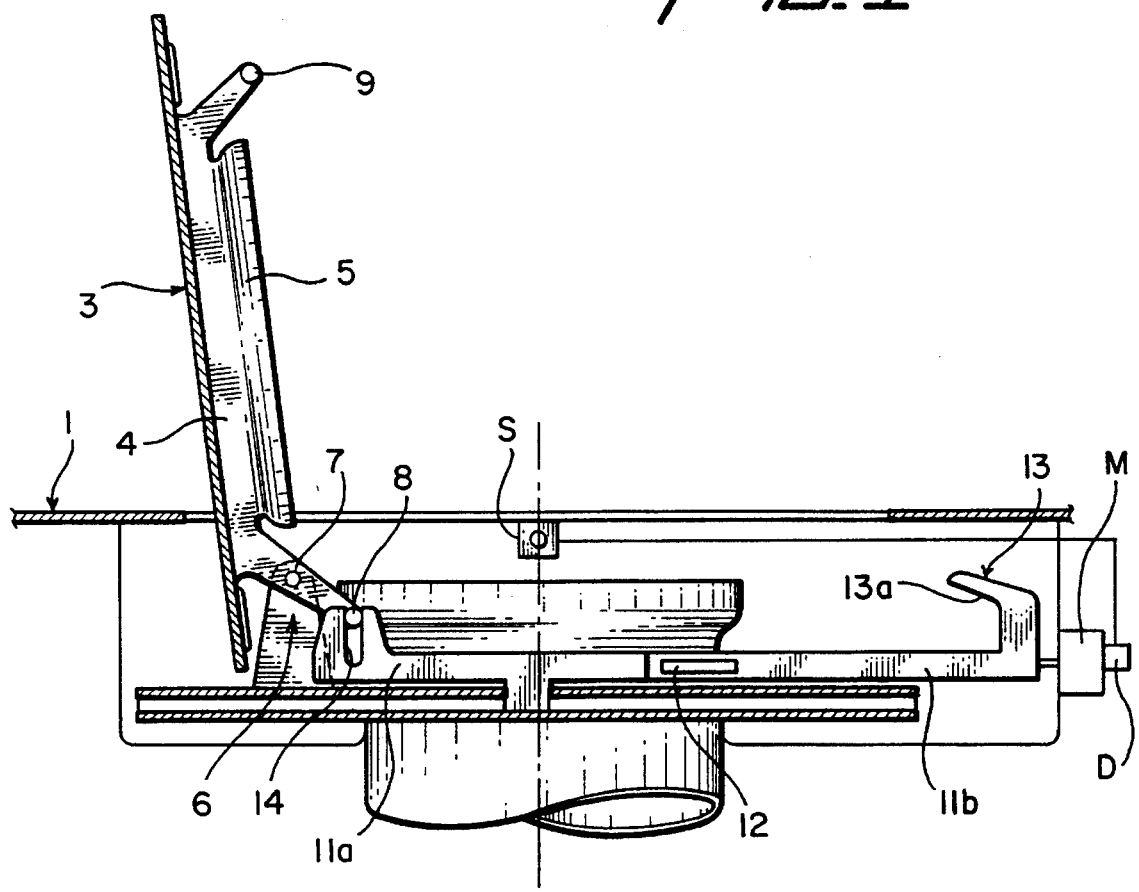
FIG. 2 is a top view showing the system in accordance with FIG. 1 in an open condition.

The following describes the function of the elements contained in the first embodiment during the opening sequence, starting from the closed position of FIG. 1, up to the point where the FIG. 2 position is reached. The action of the drive cable C causes locking element 11b to move in the direction of the arrow A, to the right in FIG. 1, by means of the drive motor M. At the outset of this movement, the drive element 11b has not yet brought the arresting block 12 into engagement with the locking element 11a, so that the drive element 11a, initially, remains in the position illustrated in FIG. 1. After the catch 13, together with the locking element 11b, has moved far enough to the right to release arresting pin 9, the arresting block 12 couples both elements 11a and 11b of the lock assembly 11 together, and thereby carries drive element 11a along in the direction of arrow A. To this end, the end portion of drive element 11a containing slot 14 leads actuating pin 8 in a circular motion around pivot axis 7 to the right (counterclockwise as shown), causing unit 3, as a whole, to be outwardly rotated around pivot axis 7 into the FIG. 2 position. In the end position, depicted in FIG. 2, the angle of traverse is greater than 90°, so that filler neck 2, which has now been exposed by unit 3, can be accessed by a fuel nozzle without interference.

During the closing procedure, the previously described steps occur in reverse order, whereby at first, elements 11a and 11b of the lock assembly 11 are moved by cable C to the left in the direction of arrow Z in FIG. 1. Once slot 14, and inherently, actuating pin 8 have reached the position depicted in FIG. 1, arresting block 12 is uncoupled by running up onto a ramp, and subsequently, locking element 11b, independent of drive element 11a, is further displaced to the left. The incline of the locking surface 13a of catch 13, relative to the movement direction of lock assembly 11, causes further movement of locking element 11b in the direction of arrow Z to exert an increasing contact pressure against arresting pin 9, thereby ensuring a secure sealing of closure element 5 at filler neck 2.

Figure 3:
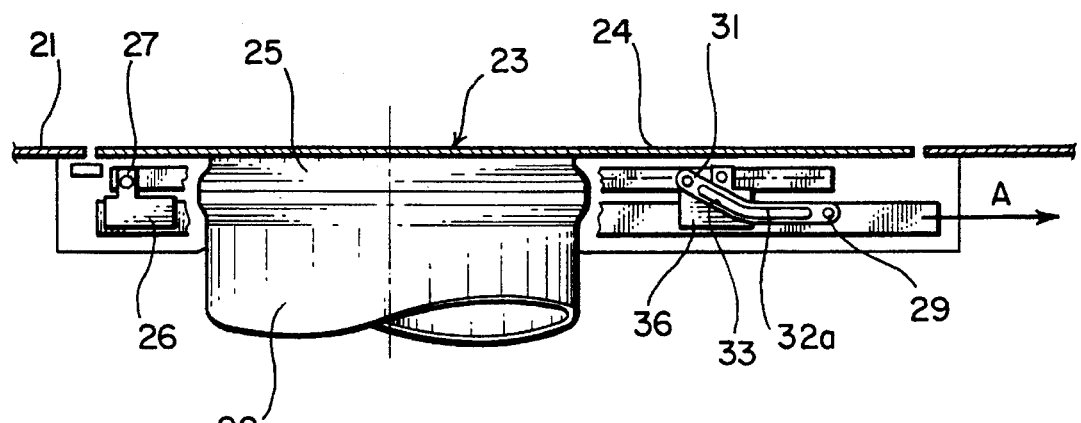
FIGS. 3–5 show top views of a tank lock system with a pivot axis mounted on a slidable carriage, in a closed condition, in a partially open condition, and in a completely open condition, respectively.
Figure 4:
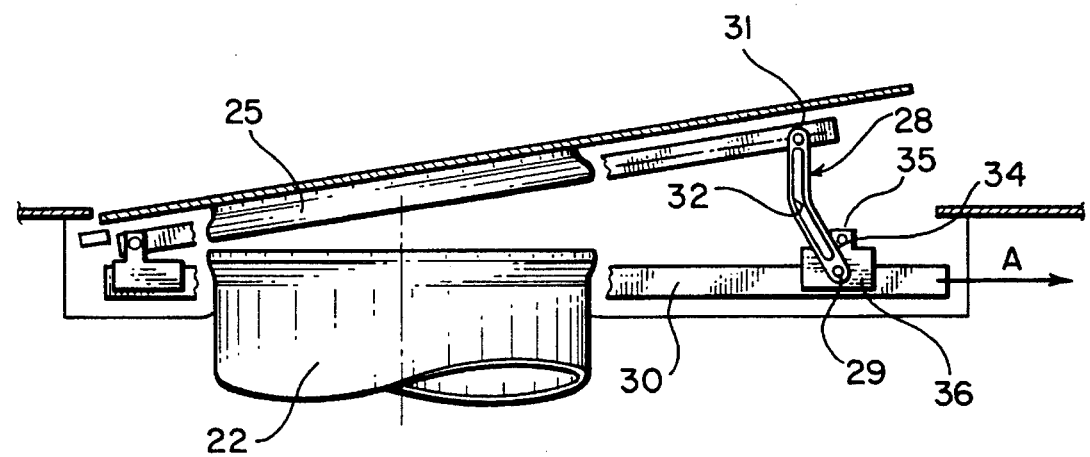
Figure 5:
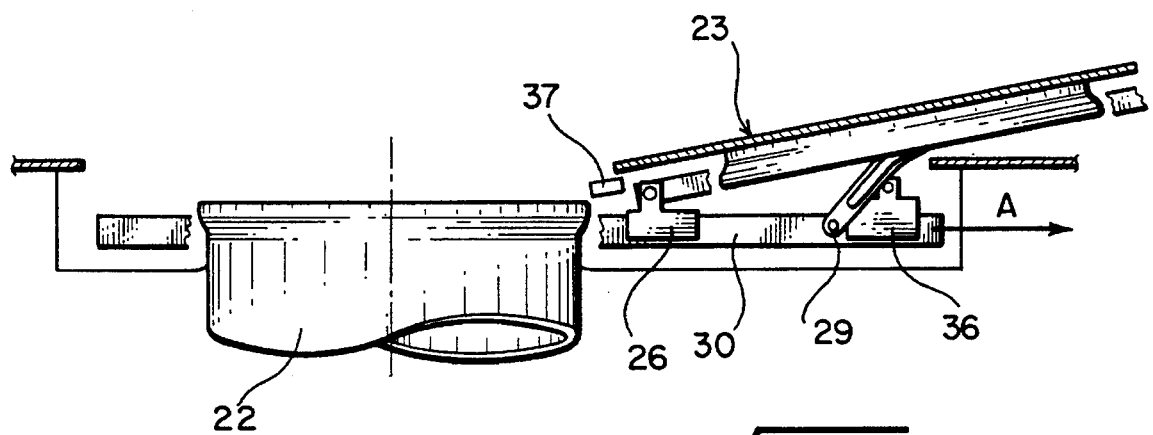

In a second embodiment, illustrated in FIGS. 3 to 5, a vehicle side wall is designated 21, and a filler neck of a gasoline tank is designated 22. A cover and closure unit 23, consisting of a closure element 25 and an outer tank cover 24, is pivotally mounted, at one side, on a sliding carriage 26 by means of pivot pin 27. This carriage 26 is moveable along a pair of guides 30, arranged above and below filler neck 22, respectively, and can be moved in a plane which is essentially normal to the axis of filler neck 22. On the other side of filler neck 22, a pair of pivot levers 28 are provided, each of which has one end pivotally mounted via a pin 29 fixed to the vehicle body at an opposite side of the levers 28 from that at which guides 30 are located. The other end of each pivot lever 28 is pivotally connected by a pin 31 to the inner side of unit 23. Pivot lever 28 also has a guide slot 32 in which a rocker arm 33 is slidably guided, and which, via a cam 34, is rotatably mounted by means of a pivot pin 35 to an actuating slider 36 that is movable along guide 30 by a drive motor via a cable drive or drive linkage, such as is shown schematically for the first embodiment.

Starting from the closed position depicted in FIG. 3, unit 23 is released as follows: the actuating slider 36 is moved by the drive motor along guide 30 in the direction of arrow A, which, in the drawing, means to the right. Rocker arm 33, pivotally connected to actuating slider 36 via cam 34, with a sliding movement in guide slot 32, causes pivot lever 28 to raise up to the position shown in FIG. 4. Slider 26, carrying pivot pin 27, still remains in its position depicted in FIG. 4. When actuating slider 36 continues to move further to the right, past the fixed pivot pin 29, pivot lever 28 starts to swing to the right, and thereby exerts a tensile force onto slider 26. A complete swinging of pivot lever 28 into the position depicted in FIG. 5, results in the movement of slider 26 completely to the right, past filler neck 22, so that unit 23 causes filler neck 22 to be fully accessible.

In the closing sequence, the previously described steps occur in reverse order. The actuating slider 36, as depicted in the drawing, moves to the left, and by means of rocker arm 33 causes pivot lever 28 to swing back. Once the front slider 26 has reached its end position according to FIG. 4, pivot lever 28 folds to the left and pulls unit 23 into the locked position depicted in FIG. 3. A bend in pivot lever 28 causes the guide slot 32 to have a slightly inclined path with respect to the moving direction of guide 30 in the area of the guide slot 32 which is the last area traversed by rocker arm 33 when moving towards the closed position. This causes rocker arm 33, in the final phase of its movement to the left, to press closure element 25 of unit 23 firmly and sealingly against filler neck 22 in a manner analogous to the effect produced by surface 13a of catch 13 in the first embodiment.

It is also contemplated that means for producing an automatic triggering of the closing operation be provided, e.g., by a sensor which is located near the filler neck, at least when it is in an open condition. The sensor, after sensing the completion of the tank fueling process, sends a control signal to the drive motor for effectuating a time-delayed closing of the unit. The sensor employed may be, for instance, a conventional optical sensor which responds to the removal of the nozzle. An automatic closing system of this kind gives particular assurance that the tank lock system is always closed, except during the fueling process. Such an arrangement, having an optical sensor S and a time delay switch D, is schematically depicted in FIG. 2; but, such a sensing arrangement is equally applicable to the embodiment of FIGS. 3–5.

In accordance with the previously described embodiments, a simple, clean and reliable fueling operation of the motor vehicle is facilitated. The focus of the invention lies in the integrated gas tank cover and gas cap, even if an actuation means other than those described herein should be utilized.

In a very simple variation of the invention, a manual actuation of the inventive unit, comprised of a tank cover and gas cap, is also possible. The unlocking, in this instance, occurs, for example, via a Bowden wire cable from the interior, and the locking occurs by simply pressing the gas tank cover shut, whereby a compressible seal at the closure element sealingly contacts the filler neck, and an arresting mechanism assumes engagement via two oppositely inclined sloping ramps, as in German reference DE 39 28 580 C2.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Fuel tank lock system for a filler neck of a gasoline tank of a motor vehicle extending to an area near the periphery of a motor vehicle body, comprising a tank cap for sealingly closing a filling opening of the filler neck, a pivotable cover which is mounted for movement between a first position coveting the area near the periphery of the vehicle body in which the filler neck is disposed and a second position providing access to said area, and a locking member for releasably securing the pivotable cover in said first position; wherein the tank cap and the tank cover are formed into a tank cap and cover unit in which they are connected for simultaneous movement together, said unit being pivotable about an axis of rotation located on a first side of said filler neck; wherein said locking member is located on a second opposite side of said filler neck from said pivot axis; and wherein drive means are provided for both releasing said locking member and removing said tank cap from the filler neck while moving said pivotable cover from said said first position to said second position and for both securing said locking member and replacing said tank cap on the filler neck while moving said pivotable cover from said second position to said first position.

2. Tank lock system according to claim 1, wherein the tank cap and cover unit is pivotally mounted on a rotational axis which is fixed relative to the vehicle body.

3. Tank lock system according to claim 1, wherein the tank cap and cover unit is pivotally mounted on a movable slider.

4. Tank lock system according to claim 3, wherein the slider is movable along a path located in a plane which is perpendicular to a longitudinal axis of the filler neck.

5. Tank lock system according to claim 1, wherein said locking member is part of a drive component of said drive means.

6. Fuel tank lock system for a filler neck of a gasoline tank of a motor vehicle extending to an area near the periphery of a motor vehicle body, comprising a tank cap for sealingly closing a filling opening of the filler neck, a pivotable cover which is mounted for movement between a first neck, a pivotable cover which is mounted for the vehicle body in which the filler neck is disposed and a second position providing access to said area, and a locking member for releasably securing the pivotable cover in said first position; wherein the tank cap and the tank cover are formed into a tank cap and cover unit; and wherein drive means are provided for releasing said locking member and removing said tank cap from the filler neck as said pivotable cover is moved from said first position to said second position and for securing said locking member and replacing said tank cap on the filler neck as said pivotable cover is moved from said second position to said first position; wherein the tank cap and cover unit is pivotally mounted on a rotational axis which is fixed relative to the vehicle body; wherein the tank cap and cover unit forms a two-armed lever; and wherein an actuating pin engaged by said drive means is mounted at an end of one arm of said two-armed lever, an arresting pin that is engagable by said locking member is mounted at an end of the other arm of said two-armed lever, and a pivot pin forming said fixed pivot axis is mounted therebetween.

7. Tank lock system according to claim 6, wherein the engagement of the actuating pin by the drive means is achieved by said actuating pin being received in a slot of a fork-type member of an element of said drive means which is displaceable in a direction which is essentially normal to a longitudinal axis of the filler neck; and wherein the locking member is displaceable in an actuating direction essentially normal to the longitudinal axis of the filler neck by said drive means and comprises a catch which embraces the arresting pin when the tank cap and cover unit is closed.

8. Tank lock system according to claim 7, wherein the catch has a locking surface which is slightly inclined with respect to the actuating direction of the lock member, said locking surface increasing contact pressure applied by the tank cap and cover unit to filler as the tank cap and cover unit reaches a closed position.

9. Tank lock system according to claim 4, wherein a pivot lever is provided at one side of the filler neck, one end of the pivot lever being pivotally connected to the tank cover and an opposite end of which is pivotally mounted to a pivot element which is fixed relative to the vehicle body; wherein a guide slot is provided in the pivot lever; and wherein a rocker arm is pivotally mounted to said slider and is engaged in said guide slot of the pivot lever.

10. Tank lock system according to claim 9, wherein an area of the guide slot traversed by said rocker arm as the tank cap and cover unit reaches the closed position is slightly inclined with respect to the path of movement of the slider as a means for applying increasing contact pressure by the tank cap and cover unit onto the filler neck.

11. Tank lock system according to claim 1, wherein a sensor means for detecting completion of a fueling process is mounted so as to be near the filler neck when it is in an open condition, said sensor being operable for triggering a time-delayed actuation of the drive means for closing of the tank cap and cover unit when completion of the fueling process is detected thereby.

12. Fuel tank lock system for a filler neck of a gasoline tank of a motor vehicle extending to an area near the periphery of a motor vehicle body, comprising a tank cap for sealingly closing a filling opening of the filler neck, a pivotable cover which is mounted for movement between a first position covering the area near the periphery of the vehicle body in which the filler neck is disposed and a second position providing access to said area, and a locking member for releasably securing the pivotable cover in said first position; wherein the tank cap and the tank cover are formed into a tank cap and cover unit; and wherein drive means are provided for releasing said locking member and removing said tank cap from the filler neck as said pivotable cover is moved from said first position to said second position and for securing said locking member and replacing said tank cap on the filler neck as said pivotable cover is moved from said second position to said first position; wherein the tank cap and cover unit is pivotally mounted on a rotational axis which is fixed relative to the vehicle body; wherein the tank cap and cover unit forms a two-armed lever, wherein an actuating pin is mounted at an end of one arm of said two-armed lever, an arresting pin that is engageable by a locking member of said releasing device is mounted at an end of the other arm of said two-armed lever, and a pivot pin forming said fixed pivot axis is mounted therebetween; and wherein said locking member is likable to said actuating pin by a disengageable drive mechanism for producing displacement of the actuating pin by displacement of the locking member.

13. Tank lock system according to claim 6, wherein the actuating pin is engaged with the drive mechanism by said actuating pin being received in a slot of a fork-type member of an element of said drive mechanism which is displaceable in a direction which is essentially normal to a longitudinal axis of the filler neck; and wherein the locking member is displaceable in an actuating direction essentially normal to the longitudinal axis of the filler neck by an operating means of said releasing device, said locking member comprising a catch which embraces the arresting pin when the tank cap and cover unit is closed.

14. Tank lock system according to claim 13, wherein the catch has a locking surface which is slightly inclined with respect to the actuating direction of the lock member, said locking surface increasing contact pressure applied by the tank cap and cover unit to filler as the tank cap and cover unit reaches a closed position.

* * * * *